United States Patent [19]

Boyle

[11] Patent Number: 5,470,475

[45] Date of Patent: Nov. 28, 1995

[54] CLARIFIER

[75] Inventor: William H. Boyle, Milwaukee, Wis.

[73] Assignee: Envirex, Inc., Waukesha, Wis.

[21] Appl. No.: 110,305

[22] Filed: Aug. 20, 1993

[51] Int. Cl.[6] .................................................. C02F 1/40
[52] U.S. Cl. ........................ 210/519; 210/521; 210/522; 210/540
[58] Field of Search ................................... 210/519, 521, 210/522, 540

[56] References Cited

U.S. PATENT DOCUMENTS

| | | | |
|---|---|---|---|
| 2,428,756 | 10/1947 | Lind | 210/3 |
| 2,734,634 | 2/1956 | Knowles | 210/55 |
| 3,395,800 | 8/1988 | Kraus et al. | 210/66 |
| 3,717,257 | 2/1973 | Boyle | 210/521 |
| 3,940,337 | 2/1976 | Robison | 210/197 |
| 4,193,877 | 3/1980 | Lillywhite | 210/520 |
| 4,663,038 | 5/1987 | Smith et al. | 210/532.1 |
| 4,722,791 | 2/1988 | Turnquist | 210/320 |
| 4,743,382 | 5/1988 | Williamson et al. | 210/528 |
| 4,919,812 | 4/1990 | Lasson | 210/519 |
| 5,035,795 | 7/1991 | Schmid | 210/532.1 |
| 5,151,185 | 9/1992 | Schmitt | 210/540 |
| 5,288,404 | 2/1994 | Marsh | 210/519 |
| 5,326,474 | 7/1994 | Adams et al. | 210/519 |

OTHER PUBLICATIONS

Envirex; Reactors—Solids–Contact with Controlled Recirculation, Bulletin No. 315–61, 5.2M, Oct. 1989.
Envirex; General Arrangement—Full Bridge—Side Feed, 5.031, Aug. 1989.
Envirex; General Arrangement—Half Bridge—Center Feed, 5.304, Aug. 1989.
Envirex; Rim–Flo Clarifiers, Bulletin No. 315–131, 4.8M, Oct. 1989.
Envirex; General Arrangement—Rim–Flo Tow–Bro—Uni–directional Flow, 7.301, Aug. 1989.
Envirex; General Arrangement—Rim–Flo Tow–Bro—Split Flow, 7.302, Aug. 1989.
Envirex; Miscellaneous Details—Rim–Flo Excess Overflow Tubes & Loadings, 7.303, Aug. 1989.
Envirex; Miscellaneous Details—Rim–Flo—Skimming Weir Gates, 7.304, Aug. 1989.
Envirex; Detail Arrangement—Influent/Effluent Channel Hydraulic Profile, 7.035, Aug. 1989.

Primary Examiner—Virginia Manoharan
Attorney, Agent, or Firm—Michael, Best & Friedrich

[57] ABSTRACT

A clarifier for separating suspended solids from waste water to provide clarified water, including a generally rectangular tank for containing waste water to be separated, the tank including generally parallel spaced apart first and second sidewalls, each sidewall having upper and lower sidewall portions, and the tank also including upper and lower regions; a first influent passage extending along at least a portion of the first sidewall and comprising an aperture for introducing waste water into the tank; a first effluent passage proximate the influent passage and including a weir over which clarified water flows for removing clarified water from the upper region of the tank. The clarifier preferably includes a baffle mounted to define a space between the first sidewall and the baffle, and a distribution baffle proximate the aperture.

9 Claims, 2 Drawing Sheets

CLARIFIER

BACKGROUND OF THE INVENTION

1. Field of the Invention

The invention relates to liquid treatment apparatus, and more particularly to clarifiers for use in the separation of solids suspended in water or waste water to provide clarified water.

2. Reference to Prior Art

Clarifiers are used in water and waste water treatment processes for the separation of suspended solids in the water or waste water to provide clarified effluent. As used herein, "waste water" includes water, waste water, and any other liquid to be treated. Waste water typically enters the tank of such a clarifier through an influent trough. In the tank, heavy waste solids settle to the bottom and form a sludge layer, which is removed from the tank by collectors. Light waste materials rise to the surface and are skimmed off. Clarified water flows over a weir into an effluent trough and is discharged.

Clarifiers are commonly either circular or rectangular in shape. An advantage of rectangular clarifiers over circular clarifiers is that arrangements of a plurality of rectangular clarifiers generally require less land area for constructing a given treatment facility than circular clarifiers because rectangular clarifiers can be arranged in closer proximity than circular clarifiers. For example, a plurality of rectangular clarifiers can be arranged side by side in a row. Rectangular clarifiers arranged side by side can share common walls and other common components. Therefore, it is often desirable to utilize rectangular clarifiers due to space and cost considerations. The prior art rectangular clarifiers commonly include an influent trough on one sidewall and an effluent trough located on an opposite sidewall, so that water flows into the tank from the influent trough on one side, across the tank, and out of the tank through the effluent trough on the opposite side.

Some prior art circular clarifiers have demonstrated advantage over prior art rectangular clarifiers by providing more efficient separation than the rectangular clarifiers of a similar surface area. This advantage is primarily attributable to different hydraulic characteristics between those prior art circular clarifiers and prior art rectangular clarifiers. A principal cause of their different hydraulic characteristics is that those circular clarifiers and prior art rectangular clarifiers utilize different influent and effluent trough arrangements. Some circular clarifiers have included trough systems wherein the influent and effluent troughs are proximate each other along the periphery of the clarifier. Such a trough system is described in U.S. Pat. No. 3,717,257 issued to Boyle on Feb. 20, 1973. In such circular clarifiers, water flows into the tank from the peripheral influent trough toward the center of the circular tank, and then flows toward the center and then back to the effluent trough.

SUMMARY OF THE INVENTION

The invention provides a rectangular clarifier having improved hydraulic characteristics and separation efficiency.

Other features and advantages of the invention are described in the following drawings, description of a preferred embodiment and the claims.

A clarifier embodying the invention includes a generally rectangular tank for containing waste water to be separated, an influent passage extending along the upper portion of one sidewall of the tank, and an effluent passage proximate and generally parallel to the influent trough. The influent passage includes a plurality of apertures for introducing waste water into the tank, and the first effluent passage includes a weir over which clarified water flows from the upper region of the tank. A skirt baffle can be mounted in the tank to define a space between the sidewall and the skirt baffle, and the apertures of the influent passage admit the waste water into the space. Preferably, the clarifier further includes a second influent passage extending along the opposite sidewall, and a second effluent passage proximate the second influent passage.

DETAILED DESCRIPTION OF A PREFERRED EMBODIMENT

Figure 1:
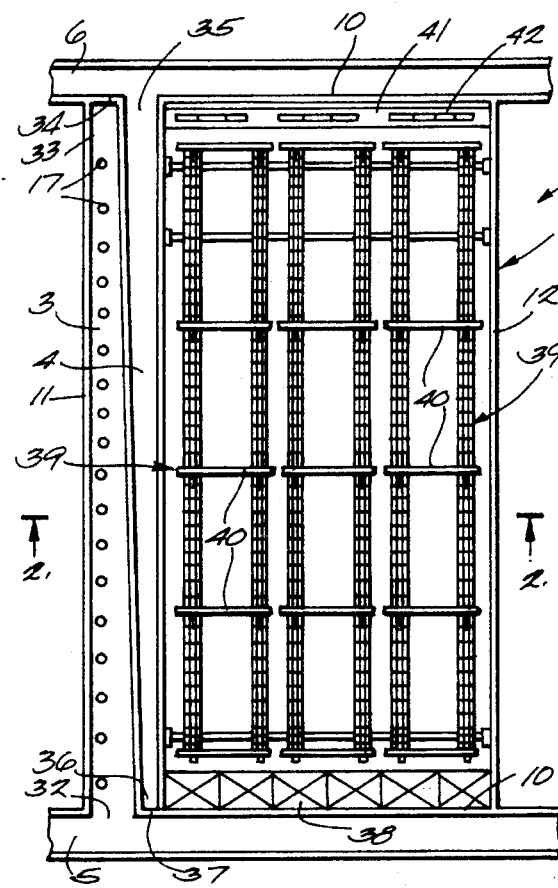
FIG. 1 is a top view of a clarifier embodying the invention.

Illustrated in FIG. 1 is a preferred embodiment of a clarifier 1 of the invention for separating suspended solids from waste water to provide clarified effluent. The clarifier 1 includes a generally rectangular tank 2, a first influent passage 3, and a first effluent passage 4. First influent passage 3 is in open communication with tank 2 for introducing waste water containing suspended solids thereto. First effluent passage 4 is in open communication with tank 2 for removing clarified effluent therefrom. The illustrated embodiment of the invention includes a primary waste water feed inlet 5 in open communication with first influent passage 3 for providing waste water thereto. In other arrangements of the invention other structures could be used for providing waste water to first influent passage 3o The illustrated embodiment of the invention also includes primary clarified effluent outlet 6 in open communication with first effluent passage 4 for removing clarified effluent therefrom. In other arrangements of the invention other structures could be used for removing clarified water from first effluent passage 4.

Figure 2:
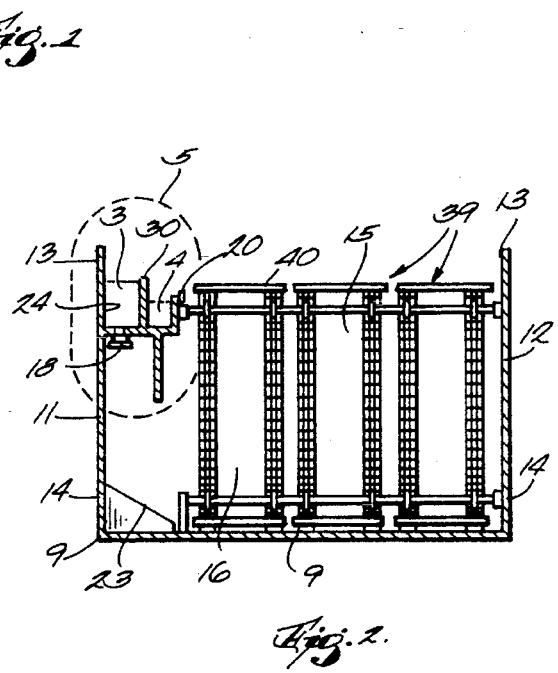
FIG. 2 is a cross sectional view taken along line 2—2 in FIG. 1.

As shown in FIG. 2, tank 2 for containing waste water to be clarified includes a bottom 9. Returning to FIG. 1, tank 2 also includes spaced apart endwalls 10 and spaced apart generally parallel first and second sidewalls 11,12o As shown in FIG. 2, the first and second sidewalls 11,12 each include an upper sidewall portion 13 and a lower sidewall portion 14. The tank 2 also includes an upper liquid region 15 and a lower liquid region 16.

Returning to FIG. 1, first influent passage 3 includes a plurality of apertures 17 in the bottom wall of the trough forming influent passage 3, the apertures 17 providing for flow from the influent passage 3 down into the tank 2. In the embodiment of the invention illustrated in FIG. 5, clarifier 1 includes a plurality of distribution baffles 18, one proximate and beneath each aperture 17. In other arrangements of the invention other structures could be used to provide for distribution of flow from the apertures 17. Each distribution baffle 18 is supported by rods 19. In the embodiment of the invention shown in FIG. 5, the first effluent passage 4 includes a weir 20 having a weir upper edge 20a, over which clarified water flows from upper region 15. In other arrangements of the invention other structures could be used to provide for flow of clarified water into first effluent passage 4. In the embodiment of the invention illustrated in FIG. 5, clarifier 1 also includes a baffle 21 mounted in the tank 2 proximate but in spaced relation from first sidewall 11, to define a space 22 into which waste water is introduced as it flows through apertures 17. In the embodiment of the invention illustrated in FIG. 2, a deflector surface 23 is provided proximate the lower sidewall portion 14 of first sidewall 11 and sloping downwardly from lower sidewall portion 14 to bottom 9. In other arrangements of the invention other structures could be used to provide for deflection of solids away from first sidewall 11 as the waste water flows into the tank.

Figure 5:
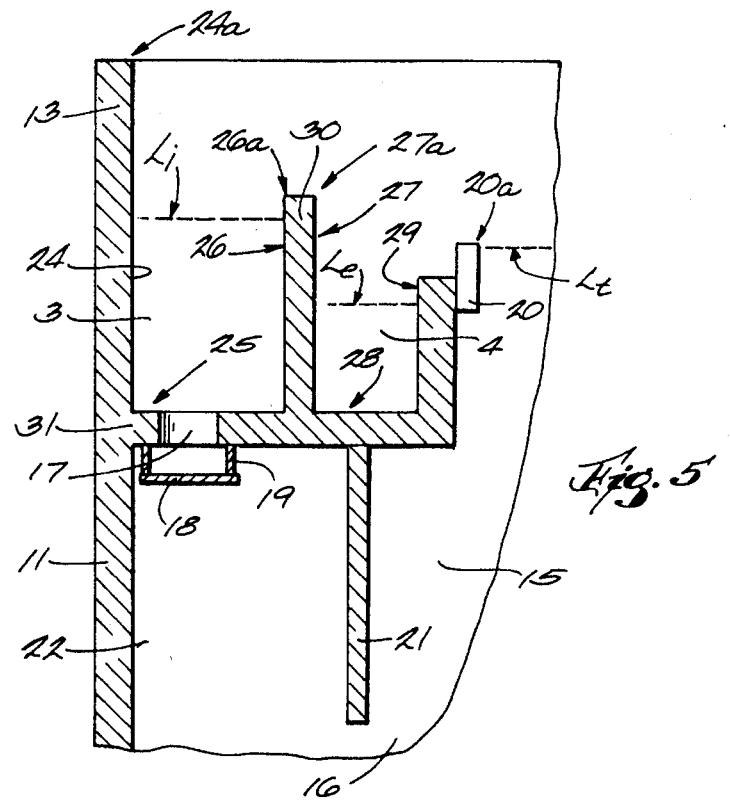
FIG. 5 is an enlarged cross sectional view of the area indicated by circle 5 in FIG. 2.

In the embodiment of the invention shown in FIG. 5, the first influent passage 3 is a first trough having an open top, and the first effluent passage 4 is a second trough having an open top. In other arrangements of the invention other constructions of the influent and effluent passages 3 and 4 could be used. First influent passage 3 is a first trough including influent outside wall 24 having influent outside upper edge 24a, influent bottom 25, and influent inside wall 26 having influent inside upper edge 26a. Apertures 17 are located in the influent bottom 25 for introducing waste water into space 22. In the illustrated embodiment, influent outside wall 24 is formed by a portion of the upper sidewall portion 13 of the first sidewall 11, so that first influent passage 3 extends generally parallel to at least a portion of the upper sidewall portion 13 of the first sidewall 11. In other arrangements of the invention other configurations could be used, such that influent passage 3 may be spaced apart from the first sidewall 11, or may only extend along part of the first sidewall 11. The first effluent passage 4 includes effluent outside wall 27 having effluent outside upper edge 27a, effluent bottom 28, and effluent inside wall 29 in the illustrated embodiment of the invention, effluent inside wall 29 includes weir 20 having weir upper edge 20a. In other arrangements of the invention other constructions could be used to provide clarified water to first effluent passage 4. Influent outside upper edge 24a and influent inside upper edge 26a are higher than weir upper edge 20a, so that the level $L_i$ of water in first influent passage 3 is higher than the level $L_e$ of water in first effluent passage 4 and the level $L_t$ of water in the tank 2. In the illustrated embodiment of the invention, effluent outside wall 27 and influent inside wall 26 are formed by a common wall 30, so that the first effluent passage 4 is adjacent to and extends along the first influent passage 3 in generally parallel side by side relation. Other arrangements of the invention could use other constructions of the first influent passage 3 and first effluent passage 4. For example, they may be spaced apart somewhat or of different lengths. In the illustrated embodiment, a shelf 31 projecting from the upper sidewall portion 13 includes both the first influent passage 3 and first effluent passage 4. In other arrangements of the invention, other structures could be used to support the passages.

Returning to FIG. 1, the first influent passage 3 includes an influent passage inlet end 32, a closed influent passage terminal end 33 terminating at influent end wall 34, an influent passage width, and an influent passage length. The first effluent passage 4 includes an effluent passage outlet end 35, a closed effluent passage terminal end 36 terminating at effluent end wall 37, an effluent passage width and an effluent passage length. In the illustrated embodiment of the invention the influent passage width progressively decreases from the influent passage inlet end 32 along the influent passage length to the influent passage terminal end 33, and the effluent passage width progressively increases from the effluent passage terminal end 36 along the effluent passage length to the effluent passage outlet end 35. In the illustrated embodiment, the influent passage inlet end 32 is also proximate the effluent passage terminal end 36, so that the influent passage width and effluent passage width together comprise a uniform total width along the length of the passages. In other arrangements of the invention, other constructions and configurations of the influent passage 3 and effluent passage 4 could be used.

While the clarifier could have other constructions for removing sludge, in the specific arrangement shown in FIGS. 1 and 2, the clarifier includes sludge hoppers 38 (not shown in FIG. 2) for receiving separated solids from the bottom 9 of tank 2. A collector conveyor 39 having collector flights 40 scrapes or fluidizes the separated solids from the bottom 9 into the sludge hoppers 38. The illustrated clarifier 1 also includes a scum pipe 41 having scum openings 42 and connected to a scum box (not shown). The scum openings 42 of scum pipe 41 are located at the level $L_t$ of water in the tank 2, for receiving floating solids skimmed from the upper region 15 by collector flights 40. The scum box receives skimmed solids from scum pipe 41 for removal from clarifier 1. In other arrangements of the invention other structures could be used to provide for removal of floating solids.

Figure 3:
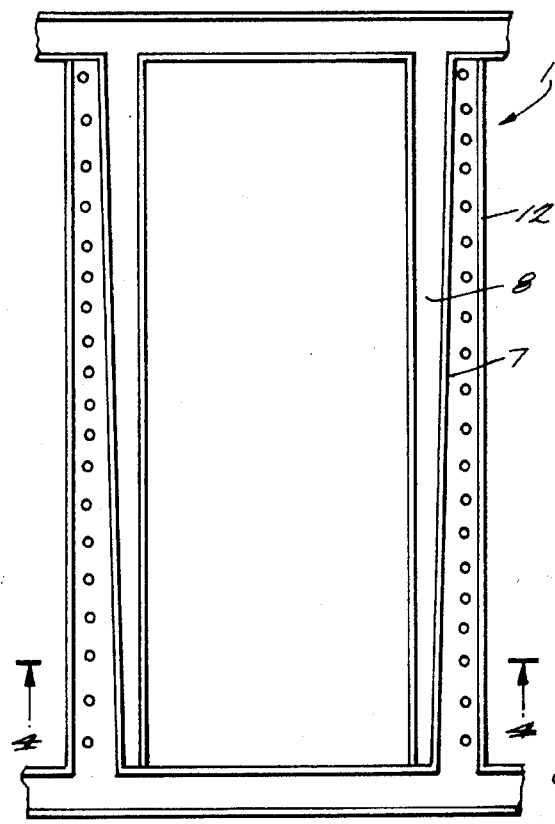
FIG. 3 is a top view similar to FIG. 1 and of a second embodiment of the invention.
Figure 4:
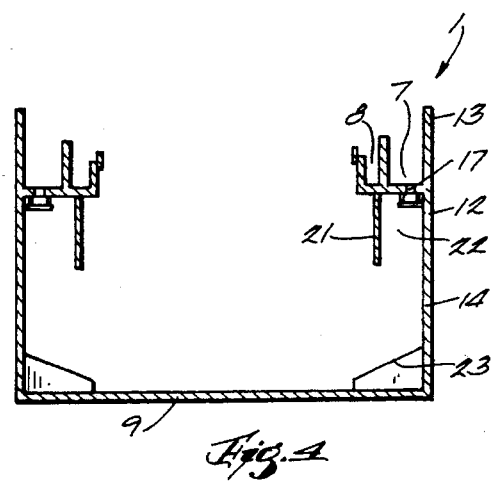
FIG. 4 is a cross sectional view taken along line 4—4 in FIG. 3.

In a second embodiment of the invention illustrated in FIGS. 3 and 4, clarifier 1 includes a second influent passage 7 extending along upper sidewall portion 13 of the second or opposite sidewall 12. A second effluent passage 8 is adjacent to and extends along second influent passage 7 in generally parallel side by side relation. A second skirt baffle 21 is mounted proximate second sidewall 12, to define a second space 22 into which waste water is introduced through apertures 17. A second deflector surface 23 slopes downwardly from second sidewall 12 to bottom 9.

Figure 6:
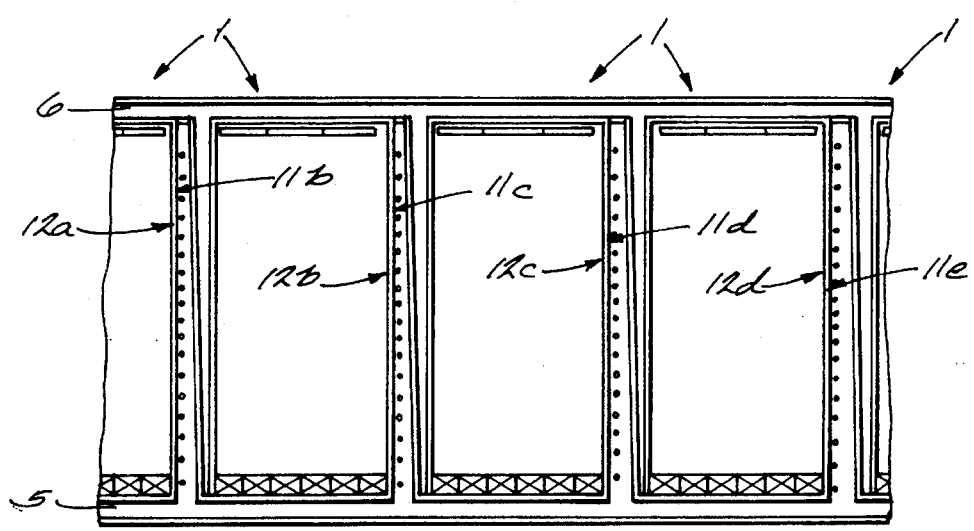
FIG. 6 is a top view of a plurality of clarifiers having a construction as shown in FIG. 1 and arranged side by side in a row.

As illustrated in FIG. 6, in one embodiment of the invention a plurality a clarifiers 1 can be arranged side by side in a row to minimize the land area or footprint required for building a treatment facility. The side by side clarifiers 1 can also utilize common elements, such as common sidewalls 12a–11b, 12b–11c, 12c–11d and 12d–11e, and a common primary waste water feed inlet 5 and primary clarified water outlet 6.

While a clarifier of the invention may include both first and second influent and effluent passages 3,4,7 and 8, the operation of a clarifier 1 having only a first influent passage 3 and first effluent passage 4 will be described.

In operation, waste water containing suspended solids enters primary waste water inlet 5 and passes into first influent passage 3 at influent inlet end 32. The waste water flows through influent passage 3 and apertures 17 into space 22 of tank 2. The introduced waste water is distributed generally horizontally in space 22 by distribution baffles 18. The waste water flows downwardly through space 22 and under skirt baffle 21, and may deflect off deflector surface 23, into lower region 16. In lower region 16, waste water flows generally horizontally away from first sidewall 11. From lower region 16 the waste water enters upper region 15. In upper region 15, waste water rises vertically upwardly with a horizontal component away from weir 20. Heavy solids settle to the bottom 9, where they are scraped by collector flights 40 of collector conveyor 39 into sludge hoppers 38 and are thereby removed from the tank 2. Light solids reaching the water surface are skimmed by collector flights 40 of collector conveyor 39 through scum openings 42 into scum pipe 41. Skimmed solids pass from scum pipe 41 into the scum box for removal from clarifier 1. After rising to the upper region 15, clarified water flows with a horizontal component towards weir 20 and overflows weir upper edge 20a into first effluent passage 4. The clarified water passes out of first effluent passage 4 at effluent outlet end 35, and into primary clarified water outlet 6 for removal from clarifier 1.

I claim:

1. A clarifier for separating suspended solids from waste water to provide clarified water, said clarifier comprising a rectangular tank for containing waste water to be separated, the tank including upper and lower regions, a bottom, endwalls and parallel spaced apart first and second sidewalls, and each of the sidewalls having upper and lower sidewall portions;

a first influent passage including an aperture for introducing waste water into the tank, the first influent passage extending along at least a portion of the sidewall upper portion of the first sidewall;

a first effluent passage for removing clarified water from the tank, the first effluent passage being adjacent to and extending in parallel side by side relation to the first influent passage and including a weir having a weir upper edge over which clarified water flows from the upper region of the tank; and a skirt baffle mounted in the tank and extending along the first sidewall to define a space between the first sidewall and the baffle, and wherein the aperture of the influent passage is located to admit waste water into the space.

2. The clarifier according to claim 1 wherein the first influent passage includes a first influent outside wall having a first influent outside upper edge, a first influent bottom, and a first influent inside wall having a first influent inside upper edge, and wherein the first effluent passage includes a first effluent outside wall having a first effluent outside upper edge, a first effluent bottom, and a first effluent inside wall including said weir and said weir upper edge.

3. The clarifier according to claim 2 wherein the weir upper edge of the first effluent passage is lower than the influent outside upper edge and influent inside upper edge of the first influent passage.

4. The clarifier according to claim 3 wherein the first influent passage is a first trough extending along a substantial portion of the upper sidewall portion of the first sidewall, and the first effluent passage is a second trough proximate the first trough.

5. The clarifier according to claim 4 wherein the influent trough includes an aperture in the influent trough bottom.

6. The clarifier according to claim 1 and further comprising a distribution baffle mounted in the tank proximate the aperture.

7. The clarifier according to claim 1 wherein the first influent passage and the first effluent passage each have a width, a length and inlet and outlet ends respectively, and wherein the first influent passage width progressively decreases from the first influent passage inlet end along the first influent passage length to the first influent passage terminal end, and wherein the first effluent passage width progressively increases from the first effluent passage inlet end along the first effluent passage length to the first effluent passage outlet end.

8. The clarifier according to claim 7 wherein the first influent passage inlet end is proximate the first effluent passage terminal end, and the first influent passage width and first effluent passage width together comprise a uniform total width along the lengths of the passages.

9. The clarifier according to claim 1 and further comprising a second influent passage extending along at least a portion of the sidewall upper portion of the second sidewall and a second effluent passage proximate the second influent passage.

* * * * *